US011873930B2

(12) United States Patent
Grujo et al.

(10) Patent No.: US 11,873,930 B2
(45) Date of Patent: Jan. 16, 2024

(54) QUICK CONNECTOR WITH SERVICE HANDLE

(71) Applicant: Novares US Engine Components, Inc., Walworth, WI (US)

(72) Inventors: Stefan Grujo, Walworth, WI (US); Christopher Schroeder, Walworth, WI (US)

(73) Assignee: Novares US Engine Components, Inc., Walworth, WI (US)

( * ) Notice: Subject to any disclaimer, the term of this patent is extended or adjusted under 35 U.S.C. 154(b) by 60 days.

(21) Appl. No.: 17/752,585

(22) Filed: May 24, 2022

(65) Prior Publication Data

US 2023/0383880 A1 Nov. 30, 2023

(51) Int. Cl.
*F16L 37/086* (2006.01)
*F16L 37/14* (2006.01)

(52) U.S. Cl.
CPC .......... *F16L 37/086* (2013.01); *F16L 37/144* (2013.01)

(58) Field of Classification Search
CPC ... F16L 37/008; F16L 37/086; F16L 37/0847; F16L 37/098; F16L 37/0985; F16L 37/10; F16L 37/101; F16L 37/127; F16L 37/133; F16L 37/138; F16L 41/021; F16L 47/32
See application file for complete search history.

(56) References Cited

U.S. PATENT DOCUMENTS

| | | | | |
|---|---|---|---|---|
| 5,630,570 A | * | 5/1997 | Lacroix | F16L 37/42 285/924 |
| 9,523,453 B2 | * | 12/2016 | Arnold | F16L 37/0982 |
| 2007/0120362 A1 | * | 5/2007 | Poder | F16L 37/0985 285/314 |
| 2010/0295292 A1 | * | 11/2010 | Wang | F16L 37/138 285/24 |
| 2012/0319401 A1 | * | 12/2012 | Wang | F16L 37/0985 285/363 |
| 2014/0284915 A1 | * | 9/2014 | Arnold | F16L 37/0982 285/82 |
| 2014/0319823 A1 | * | 10/2014 | Happich | F16L 37/101 285/309 |
| 2018/0017197 A1 | * | 1/2018 | Meister | F16L 37/244 |
| 2018/0172192 A1 | * | 6/2018 | Doh | F16L 37/0847 |

(Continued)

*Primary Examiner* — Aaron M Dunwoody
(74) *Attorney, Agent, or Firm* — Dickinson Wright PLLC

(57) ABSTRACT

A locking quick connect assembly is provided for removably coupling a first tube and a second tube. A quick connect housing presents a central bore for receiving the second tube. A redundant latch component positionable between an unlocked position and a locked position may be provided to slidingly engage the quick connect housing. A twist lock retainer surrounds the quick connect housing and the redundant latch component. The redundant latch component includes an axially extending latch retaining arm and the twist lock retainer includes a locking channel for receiving the latch retaining arm. The twist lock retainer also includes a twist lock retaining arm that locks against a bead of the second tube to resists separation. The twist lock retaining arm extends transversely to and radially inwardly of the locking channel to engage the latch retaining arm to prevent unwanted decoupling of the assembly. A handle extends from the redundant latch component in a direction opposite the latch retaining arm.

20 Claims, 5 Drawing Sheets

(56) References Cited

U.S. PATENT DOCUMENTS

| | | | |
|---|---|---|---|
| 2019/0285216 A1* | 9/2019 | Lo | F16L 33/224 |
| 2022/0010905 A1* | 1/2022 | Schröter | F16L 37/0985 |
| 2022/0042637 A1* | 2/2022 | Senftleben | F16L 37/252 |
| 2022/0186869 A1* | 6/2022 | Düperthal | F16L 37/101 |

* cited by examiner

QUICK CONNECTOR WITH SERVICE HANDLE

BACKGROUND OF THE INVENTION

1. Field of the Invention

The present invention relates to locking quick connect assemblies for removably coupling a first tube and a second tube, and more particularly to locking quick connect assemblies which include a supplemental lock/unlock feature.

2. Related Art

Locking quick connect assemblies are well known in the art for removably coupling a first tube and a second tube. Locking quick connect assemblies are widely utilized to removably couple fluid and gas lines, such as in an automobile, such as the fuel lines, brake lines, oil lines, water lines, hydraulic lines, air lines, and the like. Automobiles are typically assembled on moving assembly lines where subassemblies are installed at various locations along the line. Accordingly, locking quick connect assemblies are advantageous because they allow assembly line workers to quickly and easily connect fluid lines leading to and away from the various subassemblies as the automobile travels along the assembly line.

Additionally, it is often desired to decouple locking quick connect assemblies at a later time, such as in service and repair of the automobile. Generally, when ample space is available for viewing the locking quick connect assembly and for reaching in freely with a pair of hands, a service person can generally decouple the locking quick connect. However, in modern vehicles, space between components has become greatly diminished, thereby complicating the ability of a service person to grasp the locking quick connect with a pair of hands, let alone one hand, in a manner that allows the lock quick connect to be decoupled.

Accordingly, a locking quick connect is desired that has a supplemental lock to prevent inadvertent unlocking, while at the same time, being able to be selectively decoupled, when desired, in environments inhibiting ready access to the locking quick connect with a pair of adult sized hands, such as those of a mechanic.

SUMMARY

It is an object of the disclosure to provide a locking quick connect assembly that addresses coupling and decoupling problems with known quick connect assemblies.

It is a further object of the disclosure to provide a locking quick connect assembly that is easy to couple and decouple in relatively tight spaces.

It is a further object of the disclosure to provide a locking quick connect assembly that is economical in manufacture.

In accordance with these and other objects, a locking quick connect assembly for removably coupling at least one first tube and a second tube for fluid communication with one another is provided. The locking quick connect assembly includes a quick connect housing having a male retention segment configured for coupled attachment with the at least one first tube and a female segment extending from the male retention segment along an axis and presenting a central bore for receiving the second tube in coupled attachment therein. The female segment includes a twist lock retainer arm window. A supplemental latch component is configured for sliding movement along the female segment between an unlocked position and a locked position. The supplemental latch component includes an annular body and a latch retaining arm extending from the annular body in generally parallel relation with the axis. A twist lock retainer surrounds at least a portion of the female segment and at least a portion of the supplemental latch component. The twist lock retainer includes a locking channel for receiving the latch retaining arm and a twist lock retaining arm extending circumferentially in radially inward relation with the locking channel. The twist lock retaining arm is configured to engage the twist lock retainer arm window of the female segment, and to underlie the latch retaining arm when the latch retaining arm is fully received in the locking channel and the supplemental latch component is in the locked position, whereat the latch retaining arm prevents release of the twist lock retaining arm from the twist lock retaining window. A handle extends away from the annular body in a direction opposite the latch retaining arm.

In accordance with another aspect of the disclosure, the handle can be formed of a separate piece of material from the annular body and subsequently fixed thereto.

In accordance with another aspect of the disclosure, the handle can be formed being generally U-shaped.

In accordance with another aspect of the disclosure, the male retention segment of the quick connect housing includes a pair of male retention segments extending away from a midsection in coaxially aligned relation with one another for attachment of a pair of first tubes, with the female segment extending from the midsection.

In accordance with another aspect of the disclosure, the handle is generally U-shaped extending about the midsection, with the handle having a pair of legs extending from the annular body and a cross-arm extending between the pair of legs.

In accordance with another aspect of the disclosure, the handle can be formed of a separate piece of material from the annular body and subsequently fixed thereto.

In accordance with another aspect of the disclosure, the annular body has an annular collar extending radially outwardly therefrom, with the annular collar having a plurality of openings, with the pair of legs of the handle being snap fit into the plurality of openings.

In accordance with another aspect of the disclosure, the each leg of the pair of legs can include a spring finger, the spring fingers being snap fit into the plurality of openings.

In accordance with another aspect of the disclosure, the handle is configured to be pushed along the axis to move the supplemental latch component from the unlocked position to the locked position, and wherein the handle is configured to be pulled along the axis to move the supplemental latch component from the locked position to the unlocked position.

In accordance with another aspect of the disclosure, the handle is configured to be rotated about the axis when the supplemental latch component is in the unlocked position to rotate the twist lock retainer about the axis, whereupon the twist lock retaining arm is disengaged from the twist lock retainer arm window of the female segment.

In accordance with another aspect of the disclosure, a method of constructing a locking quick connect assembly for removably coupling at least one first tube and a second tube with one another is provided. The method includes: providing a quick connect housing including a male retention segment configured for coupled attachment with the at least one first tube and a female segment extending from the male retention segment along an axis and presenting a central bore for receiving the second tube in removably coupled attachment therein, with the female segment being provided having a twist lock retainer arm window. Further, providing a supplemental latch component configured for sliding movement along the female segment between an unlocked position and a locked position, with the supplemental latch component including an annular body and a latch retaining arm extending from said annular body in generally parallel relation with the axis. Further yet, providing a twist lock retainer including a locking channel extending generally parallel with the axis and a twist lock retaining arm extending circumferentially relative to the axis. Then, disposing the supplemental latch component about the female segment, and disposing the twist lock retainer about the female segment, with the twist lock retaining arm being configured to engage the twist lock retainer arm window of the female segment and to extend radially inwardly of the locking channel, and with the latch retaining arm of the supplemental latch component being partially disposed in the locking channel; and providing a handle extending from the annular collar in a direction opposite the latch retaining arm, with the handle being configured to be pushed along the axis to move the supplemental latch component from the unlocked position to the locked position, whereat the latch retaining arm is brought into overlying relation with the twist lock retaining arm to maintain the twist lock retaining arm in engaged relation with the twist lock retainer arm window, and with the handle being configured to be pulled along the axis to move the supplemental latch component from the locked position to the unlocked position, whereat the latch retaining arm is removed from overlying relation with the twist lock retaining arm.

In accordance with another aspect, the method can further include configuring the handle to be rotated about the axis when the supplemental latch component is in the unlocked position to concurrently rotate the twist lock retainer about the axis, whereupon the twist lock retaining arm is disengaged from the twist lock retainer arm window of the female segment.

In accordance with another aspect, the method can further include providing the handle being formed of a separate piece of material from the annular body, with the handle being subsequently fixed to the annular body.

In accordance with another aspect, the method can further include snap fitting said handle to the annular body.

In accordance with another aspect, the method can further include providing the annular body having an annular collar including a plurality of openings and providing the handle having a pair of legs with spring fingers, and snap fitting the spring fingers into the plurality of openings.

In accordance with another aspect, the method can further include providing the male retention segment of the quick connect housing having a pair of male retention segments extending away from a midsection in coaxially aligned relation with one another for attachment of a pair of first tubes, with the female segment extending from the midsection.

In accordance with another aspect, the method can further include providing the handle being generally U-shaped extending about the midsection, having a pair of legs extending from the annular collar and a cross-arm extending between the pair of legs.

In accordance with another aspect, the method can further include snap fitting the pair of legs to the collar.

In accordance with another aspect, the method can further include configuring the second tube to be received in the central bore and brought into locked engagement with the twist lock retaining arm while pushing the handle prior to the supplemental latch component being moved from the unlocked position to the locked position.

BRIEF DESCRIPTION OF THE DRAWINGS

Other objects, features and advantages of the present invention will be readily appreciated, as the same becomes better understood by reference to the following detailed description when considered in connection with the accompanying drawings wherein.

DETAILED DESCRIPTION OF PRESENTLY PREFERRED EMBODIMENTS

Referring to the Figures, wherein like numerals indicate corresponding parts throughout the several views, a locking quick connect assembly 20 for removably coupling at least one first tube, shown as a pair of first tubes 22, by way of example and without limitation, and a second tube 24 for fluid communication (meaning liquid fluid or gas) with one another is disclosed.

In a variety of different applications, it is desirable to removably couple the first tubes 22 to the second tube 24 such that fluid or gas may be communicated through a connector assembly 20. Without intending to be limited to a specific application, an exemplary application is in the automotive industry where a quick connect assembly 20 is desirable to facilitate automobile assembly and repair operations, particularly in tight environments where limited space is available to access the area of the connector assembly 20. In this application, the first tubes 22 and second tube 24 are often made of an extruded plastic material and are used to communicate fluids or gas associated with the operation of an automobile. The second tube 24, sometimes referred to as an SAE pin, typically includes an annular flange, also referred to as bead 26, that extends annularly about the second tube 24.

Figure 1:
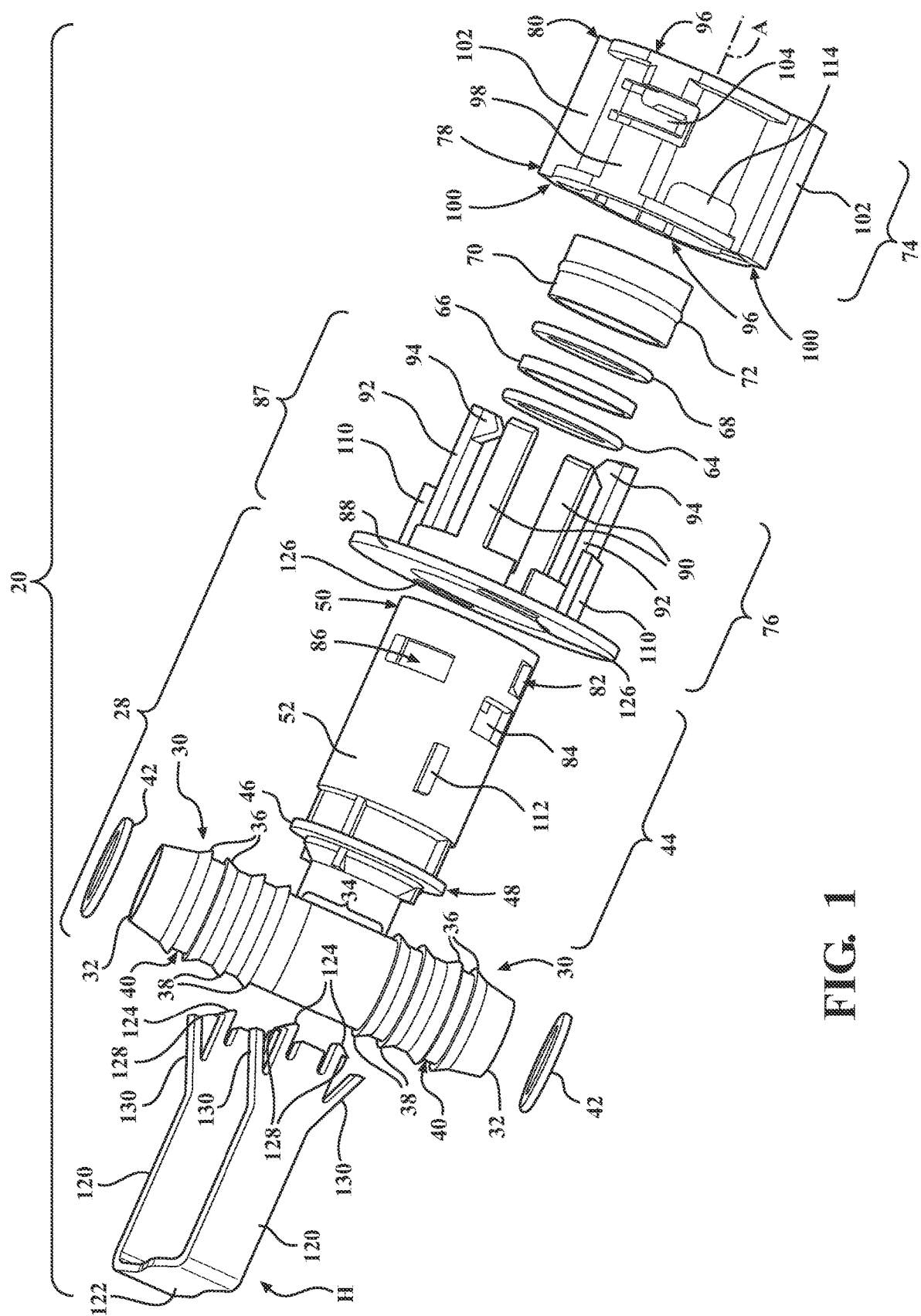
FIG. 1 is an exploded elevational view of an exemplary locking quick connect assembly of the present invention illustrated complete with a redundant latch component.

Referring to FIG. 1, the quick connect assembly 20 disclosed includes a quick connect housing 28. While the quick connect housing 28 may be made from a variety of different materials, one such material may be an injection molded polymer. The quick connect housing 28 presents at least one male retention segment, as shown as a pair of male retention segments 30, by way of example and without limitation, of tubular shape for engagement with the first tubes 22. Specifically, the male retention segments 30 of the non-limiting embodiment illustrated, by way of example and without limitation, extend away from one another in coaxial relation, and away from a midsection 34 to a pair of ends 32 configured for insertion into the respective first tubes 22. The male retention segments 30 of the quick connect housing 28 each include a plurality of annular barbs 36, 38 extending radially about the male retention segments 30 for providing engagement of the first tubes 22. The plurality of annular barbs 36, 38 includes a pair of sealing barbs 36 proximate to the ends 32 of the male retention segments 30 and a pair of retention barbs 38 disposed between the midsection 34 of the male retention segment 30 and the pair of sealing barbs 36.

Each of the pairs of sealing barbs 36 are axially spaced from one another and ramped in opposite directions to present a seal channel 40 therebetween. Accordingly, each sealing barb 36 of the pair of sealing barbs 36 has a greatest radial diameter immediately adjacent the seal channel 40. A barb seal 42 is disposed in each seal channel 40 of the male retention segments 30 to provide sealing engagement as the first tubes 22 are pressed over the male retention segments 30 of the quick connect assembly 20. The barb seal 42 may be, but is not limited to, an elastomeric o-ring.

The pair retention barbs 38 are axially spaced from one another. Each retention barb 38 of the pair retention barbs 38 is ramped up to a greater radial diameter proximate, or closer, to the midsection 34 of the male retention segments 30 to facilitate insertion of the male retention segments 30 into the first tubes 22 and to resist subsequent separation between the first tubes 22 and the male retention segments 30 of the quick connect housing 28. In other words, the pair of retention barbs 38 are ramped up in the direction the male retention segments 30 of the quick connect housing 28 is inserted into the first tubes 22.

The quick connect housing 28 also includes a female segment 44 that extends axially along an axis A in generally transverse relation away from the midsection 34 of the male retention segments 30. In the exemplary, non-limiting embodiment illustrated, the male retention segments 30 and the female segment 44 of the quick connect housing 28 are co-axially misaligned relative to one another, with the male retention segments 30 extending in coaxially aligned relation with one another in generally transverse relation to the axis A, and the female segment 44 extending generally long the axis A in parallel relation thereabout. Accordingly, a non-limiting embodiment of the quick connect housing 28 is generally T-shaped. A flange 46 extends annularly about the female segment 44 of the quick connect housing 28. The female segment 44 of the quick connect housing 28 includes a proximal end 48 adjacent the flange 46 and a distal end 50 opposite the proximal end 48. The female segment 44 has a tubular shape with an exterior surface 52 and an interior surface 54 opposite the exterior surface 52.

Figure 3:
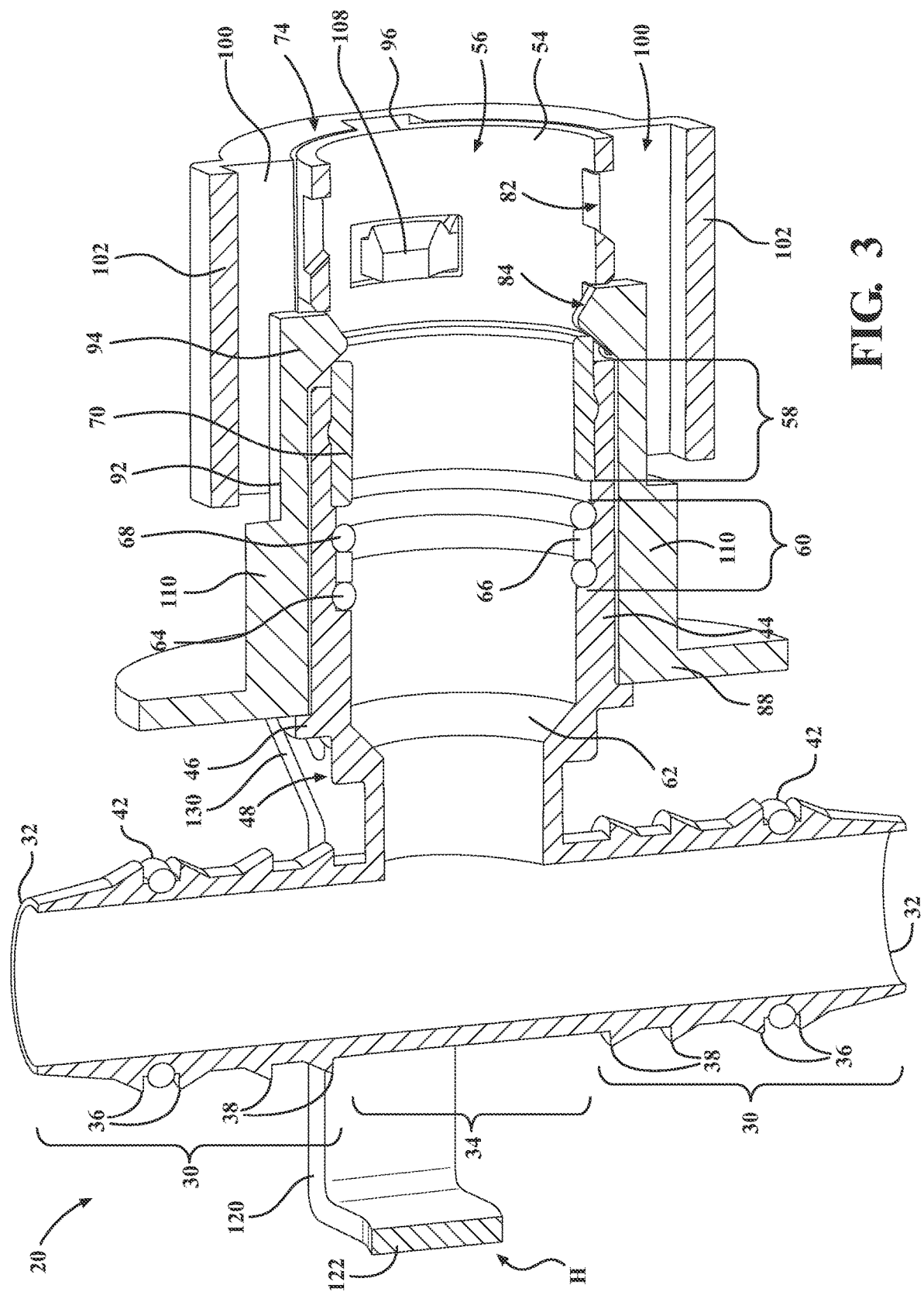
FIG. 3 is a cross-sectional elevational view of the exemplary locking quick connect assembly of FIG. 2 illustrated in the unlocked position.
Figure 5:
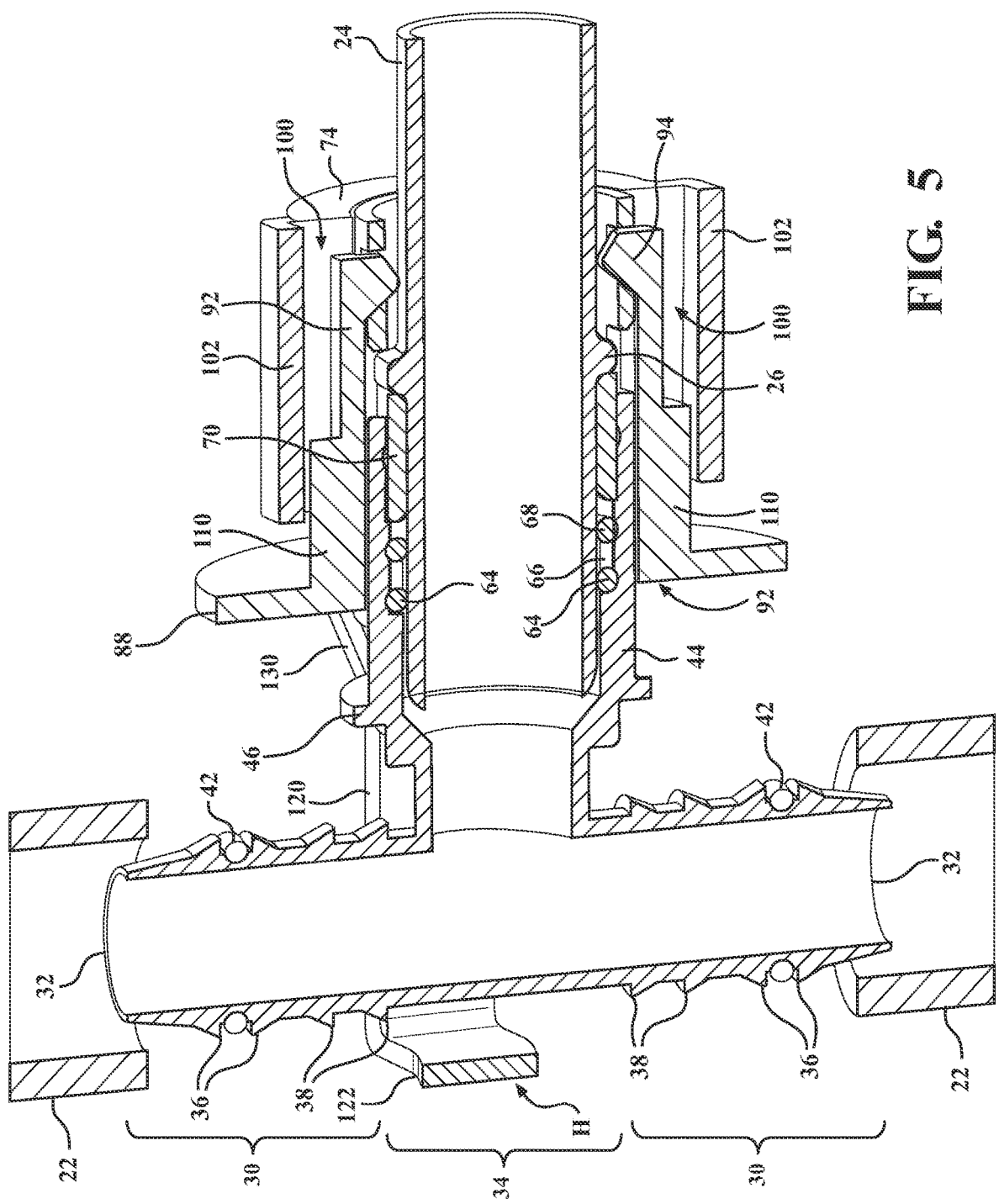
FIG. 5 is a cross-sectional elevational view of the exemplary locking quick connect assembly of FIG. 2 illustrated in a locked position.

Referring to FIGS. 3 and 5, the interior surface 54 of the female segment 44 defines a central bore 56 for receiving the second tube 24. More specifically, the interior surface 54 of the female segment 44 includes a first step portion 58 adjacent the distal end 50 of the female segment 44 and a second step portion 60 adjacent the first step portion 58 and closer to the proximal end 48 of the female segment 44. The first step portion 58 has a predetermined diameter and the second step portion 60 has a smaller diameter than the predetermined diameter of the first step portion 58. The interior surface 54 of the female segment 44 can include a transition portion 62 adjacent the proximal end 48 of the female segment 44 where the female segment 44 transitions to the midsection 34 of the male retention segments 30. In other words, moving from the distal end 50 of the female segment 44 to the proximal end 48 of the female segment 44, the larger diameter first step portion 58 gives way to the smaller diameter second step portion 60 which gives way to the transition portion 62.

An inner seal 64 is disposed in the second step portion 60 of the central bore 56 proximate to the proximal end 48 of the female segment 44 to provide sealing engagement as the second tube 24 is received in the central bore 56. An inner seal spacer 66 is disposed in the second step portion 60 of the central bore 56 adjacent the inner seal 64 and closer to the distal end 50 of the female segment 44 than the inner seal 64. While the inner seal spacer 66 can be made of a variety of materials, one such material may be an injection molded polymer. An outer seal 68 is also disposed in the second step portion 60 of the central bore 56 adjacent the inner seal spacer 66 and closer to the distal end 50 of the female segment 44 than the inner seal spacer 66 to provide sealing engagement with the second tube 24 when the second tube 24 is received in the central bore 56. While the inner seal 64 and the outer seal 68 may be made of a variety of different materials and take many forms, the inner seal 64 and the outer seal 68 may be an o-ring made of an elastomeric material. Accordingly, the inner seal spacer 66 is sandwiched in the second step portion 60 between the inner seal 64 and the outer seal 68 with the inner seal 64 being closer to the proximal end 48 of the female segment 44 and the outer seal 68 being closer to the distal end 50 of the female segment 44.

An outer seal spacer 70 is disposed in the first step portion 58 of the central bore 56 to contain the outer seal 68. The outer seal spacer 70 includes an annular bead 72 protruding radially outwardly for engagement with the interior surface 54 of the female segment 44 of the quick connect housing 28. As the second tube 24 is received in the central bore 56 of the female segment 44, the bead 26 of the second tube 24 impacts the outer seal spacer 70. Accordingly, the outer seal spacer 70 acts as a stop that prevents over insertion of the second tube 24 into the central bore 56.

Figure 4:
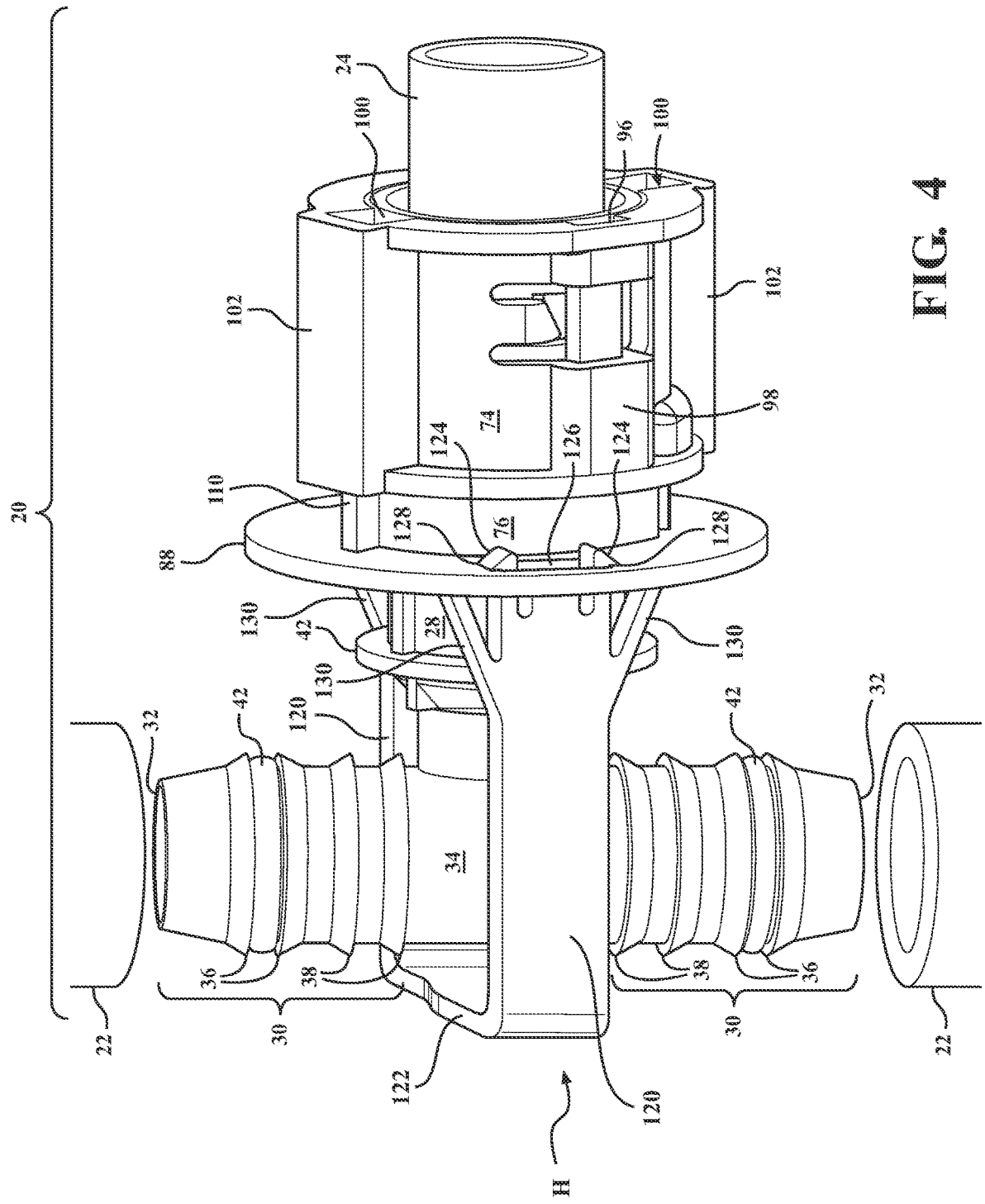
FIG. 4 is a perspective elevational view of the exemplary locking quick connect assembly of FIG. 2 illustrated in a locked position.

Referring now to FIGS. 4 and 5, the quick connector assembly further includes a twist lock retainer 74 and a latch component, also referred to as supplemental latch component or redundant latch component 76. Generally, the twist lock retainer 74 functions to lock the second tube 24 within the central bore 56 of the female segment 44 of the quick connect housing 28. This prevents separation of the second tube 24 from quick connect housing 28 and ultimately the first tubes 22. The redundant locking function of the redundant latch component 76 ensures the coupling of the second tube 24 and the quick connect assembly 20 remains intact. The redundant latch component 76 is positionable between an unlocked position and a locked position to provide a secondary or redundant locking function. While the twist lock retainer 74 and the redundant latch component 76 may be made of a variety of different materials, one such material may be an injection molded polymer.

Referring to FIGS. 3 and 5, the twist lock retainer 74 of the disclosed quick connect assembly 20 is disposed radially outwardly of, and surrounds at least a portion of the female segment 44 of the quick connect housing 28. The twist lock retainer 74 is also disposed radially outwardly of, and surrounds and at least a portion of the redundant latch component 76. Further, the twist lock retainer 74 extends axially from a proximal end 78 along axis A to a distal end 80. The distal end 80 of the twist lock retainer 74 may be axially aligned with the distal end 50 of the female segment 44 of the quick connect housing 28 such that the distal end 80 of the twist lock retainer 74 is flush with the distal end 50 of the female segment 44 of the quick connect housing 28.

Referring now to FIGS. 1, 3, and 5, the female segment 44 of the quick connect housing 28 includes at least a first redundant latch retainer arm window 82 which may be a first pair of radially opposed redundant latch retainer arm windows 82. The first pair of redundant latch retainer arm windows 82 may extend entirely through the female segment 44 from the exterior surface 52 to the interior surface 54 with the first pair of redundant latch retainer arm windows 82 being proximate to the distal end 50 of the female segment 44. The female segment 44 of the quick connect housing 28 also includes at least a second redundant latch retainer arm window 84 which may be a second pair of radially opposed redundant latch retainer arm windows 84. The second pair of redundant latch retainer arm windows 84 may extend entirely through the female segment 44 from the exterior surface 52 to the interior surface 54. The second pair of redundant latch retainer arm windows 84 are axially spaced between the proximal end 48 of the female segment 44 and the first pair of redundant latch retainer arm windows 82. Additionally, at least part of the second redundant latch retainer arm windows 84 are axially aligned with the first redundant latch retainer arm windows 82.

The female segment 44 of the quick connect housing 28 also includes at least one twist lock retainer arm window 86 which may be a pair of radially opposed twist lock retainer arm windows 86. The pair of twist lock retainer arm windows 86 extend entirely through the female segment 44 from the exterior surface 52 to the interior surface 54 and may be circumferentially spaced from the first pair of redundant retainer lock windows 82 and the second pair of redundant retainer lock windows 84.

The redundant latch component 76 of the quick connect assembly 20 includes an annular body 87 with an annular collar 88 extending radially outwardly from the annular body 87, with the collar 88 being configured for a close fit about the exterior surface 52 of the female segment 44, and in an exemplary embodiment, for sliding engagement with the exterior surface 52 of the female segment 44 of the quick connect housing 28. The redundant latch component 76 also includes at least a first redundant latch retaining arm, which may be a first pair of redundant latch retaining arms 90 being radially opposed and extending axially in a first direction from the annular collar 88 in generally parallel relation with axis A. The redundant latch component 76 may further include at least one second redundant latch retaining arm, which may be a second pair of redundant latch retaining arms 92 being radially opposed and extending axially along the first direction from the annular collar 88 in generally parallel relation with axis A. When present, the second pair of redundant latch retaining arms 92 may be circumferentially spaced from the first pair of redundant latch retaining arms 90.

Figure 2:
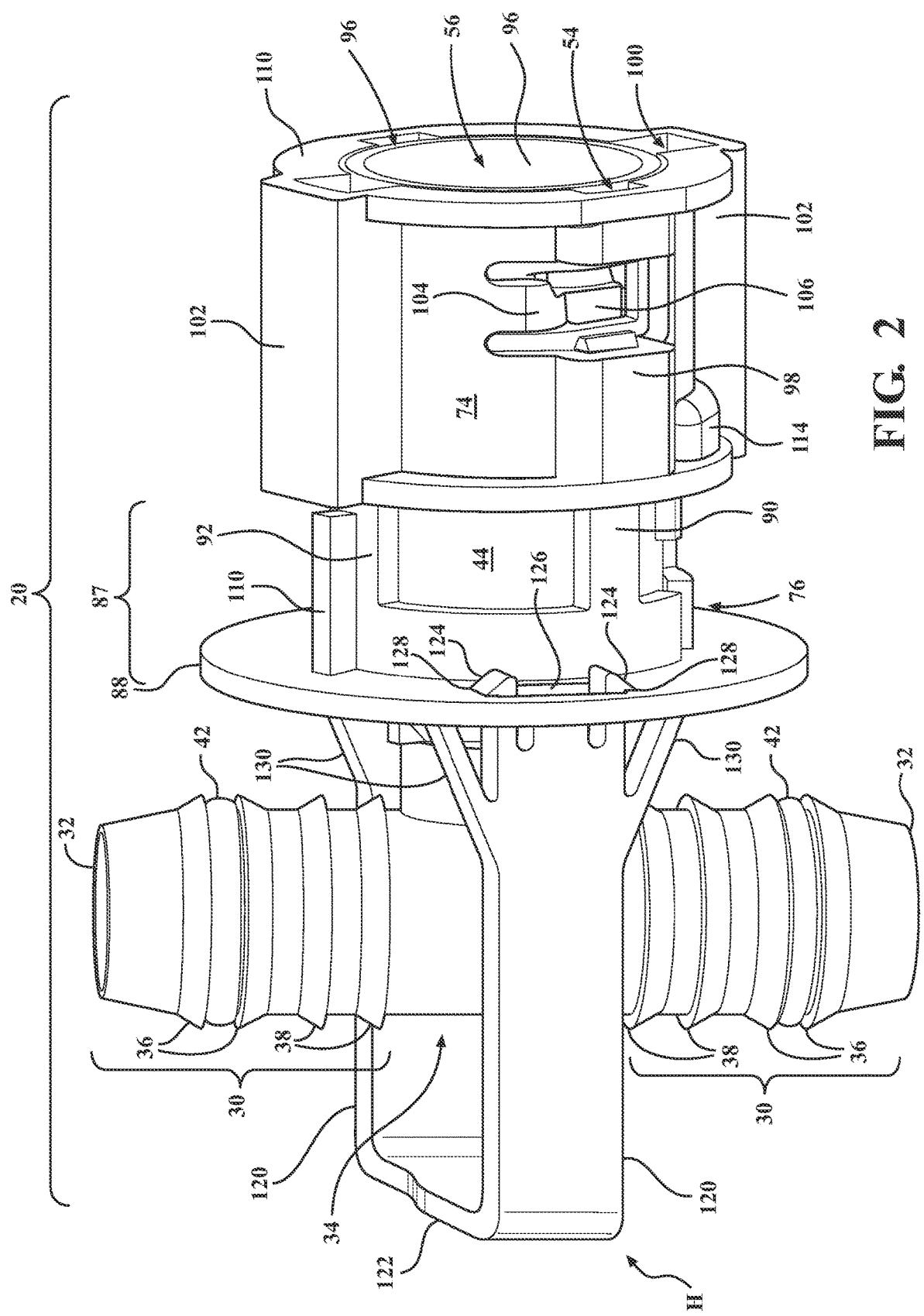
FIG. 2 is a perspective elevational view of an exemplary locking quick connect assembly of the present invention illustrated in an unlocked position.

The second pair of redundant latch retaining arms 92 may have inwardly ramped ends 94 for sequential engagement with the second pair of redundant latch retainer arm windows 84 and the first pair of redundant latch retainer arm windows 82. As shown in FIGS. 2 and 3, the unlocked position of the redundant latch component 76 is defined where the inwardly ramped ends 94 of the second pair of redundant latch retaining arms 92 are engaged in the second pair of redundant latch retainer arm windows 84. As shown in FIGS. 4 and 5, the locked position of the redundant latch component 76 is defined where the inwardly ramped ends 94 of the second pair of redundant latch retaining arms 92 are engaged in the first pair of redundant latch retainer arm windows 82. It should also be appreciated that in the unlocked position, the annular collar 88 of the redundant latch component 76 contacts the flange 46 of the quick connect housing 28. Then, as the second tube 24 is received in the central bore 56 and the annular collar 88 of the redundant latch component 76 is pushed and slid along axis A toward the distal end 50 of the female segment 44, the redundant latch component 76 is advanced to the locked position.

Referring to FIGS. 1 and 2, the twist lock retainer 74 of the quick connect assembly 20 includes at least one locking channel, which may be a pair of radially opposed locking channels 96 for receiving the first pair of redundant latch retaining arms 90 slidably therein as the redundant latch component 76 is pushed along axis A. The pair of locking channels 96 may be defined by locking channel pockets 98 protruding radially outwardly from the twist lock retainer 74. Both the pair of locking channels 96 and the respective locking channel pockets 98 may extend from the proximal end 80 of the twist lock retainer 74 to the distal end 78 of the twist lock retainer 74. The twist lock retainer 74 may also include at least one guide channel, which may be a pair of radially opposed guide channels 100 for slidably receiving the second pair of redundant latch retaining arms 92 as the redundant latch component 76 is pushed along axis A. The pair of guide channels 100 may be defined by guide channel pockets 102 protruding radially outwardly from the twist lock retainer 74. Both the pair of guide channels 100 and the respective guide channel pockets 102 may extend from the proximal end 78 of the twist lock retainer 74 to the distal end 80 of the twist lock retainer 74.

The twist lock retainer 74 further includes at least one twist lock retaining arm 104, which may be a pair of twist lock retaining arms 104. The pair of twist lock retaining arms 104 may be arranged to extend in cantilevered fashion transversely to axis A, and thus, perpendicularly to the pair of locking channels 96. The pair of twist lock retaining arms 104 extend radially inwardly of the pair of locking channels 96 for receipt in, and engagement with the pair of twist lock retainer arm windows 86 of the female segment 44 of the quick connect housing 28. The pair of twist lock retaining arms 104 include an outside face 106 (FIG. 2) and an inside face 108 (FIG. 3) opposite the outside face 106. As best seen in FIG. 4, the outside face 106 of the pair of twist lock retaining arms 104 is curved radially inwardly to interleavingly engage an inner surface of the first pair of redundant latch retaining arms 90 as the first pair of redundant latch retaining arms 90 are slidingly received in the pair of locking channels 96 and the redundant latch component 76 is advanced to the locked position. It should be appreciated that the interleaving engagement of the outside face 106 of the twist lock retaining arms 104 and the inner surface of the first pair of redundant latch retaining arms 90 provides a supplemental, redundant locking feature. More particularly, the first pair of redundant latch retaining arms 90 are sandwiched between the outside face 106 of the twist lock retaining arms 104 and the locking channel pockets 98 when the redundant latch component 76 is advanced to the locked position, thereby preventing the twist lock retaining arms 104 from retracting or moving radially outwardly, thereby preventing the disengaging of the redundant latch retaining arms 90 from the twist lock retainer arm windows 86 of the female segment 44.

As best seen in FIG. 3, the inside face 108 of the pair of twist lock retaining arms 104 is ramped up in an axial direction to a greater radial thickness toward the proximal end 78 of the twist lock retainer 74. Accordingly, the inside face 108 of the pair of twist lock retaining arms 104 is ramped up in a second direction, opposite the first direction, the second tube 24 is inserted along axis A into the central bore 56 of the female segment 44. Accordingly, the inside face 108 of the pair of twist lock retaining arms 104 facilitates insertion of the second tube 24 into the central bore 56 of the female segment 44 of the quick connect housing 28 and resists subsequent separation between the second tube 24 and the quick connect housing 28 by locking in an interference blocking relation against the bead 26 of the second tube 24.

It should be appreciated that the design of the twist lock retainer 74 and the redundant latch component 76 provide a two stage locking quick connect assembly 20. In the first stage, the second tube 24 is inserted in the second direction into the central bore 56 along axis A until it hits the outer seal spacer 70. During the first stage, the bead 26 of the second tube 24 presses against the twist lock retaining arms 104 of the twist lock retainer 74 which extend into the central bore 56 through the twist lock retainer arm windows 86. The bead 26 of the second tube 24 interacts with the inside face 108 of the pair of twist lock retaining arms 104 to push the pair of twist lock retaining arms 104 radially outwardly. As the bead 26 of the second tube 24 passes the pair of twist lock retaining arms 104 during continued insertion in the second direction into the central bore 56, the pair of twist lock retaining arms 104 snap resiliently back down into the central bore 56 through the twist lock retainer arm windows 86 with an audible and/or tactile click. Since the bead 26 of the second tube 24 has passed the ramped up shape of the inside face 108 of the pair of twist lock retaining arms 104, the second tube 24 is locked in place and the bead 26 of the second tube 24 cannot move backward in the first direction, opposite the second direction, against pair of twist lock retaining arms 104. In the second stage, the redundant latch component 76 is advanced from the unlocked position in the first direction along axis A to the locked position. This advances the first pair of redundant latch retaining arms 90 into the locking channels 96 to interleavingly engage the outside face 106 of the pair of twist lock retaining arms 104. During the second stage, the inwardly ramped ends 94 of the second pair of redundant latch retaining arms 92 disengage from the second pair of redundant latch retainer arm windows 84. As the redundant latch component 76 is advanced along axis A in the first direction by pushing axially on a handle H of the redundant latch component 76, the inwardly ramped ends 94 of the second pair of redundant latch retaining arms 92 engage the first pair of redundant latch retainer arm windows 82 with an audible and/or tactile click. Advantageously, the two audible and/or tactile clicks of this two-stage procedure provide an indication that the redundant quick connect assembly 20 has been properly installed and locked. This is particularly useful in blind install situations where the user cannot see the quick connect assembly 20 during and/or after the installation procedure.

It should further be appreciated that the redundant latch component 76 cannot be advanced to the locked position until the second tube 24 is fully inserted into the central bore 56 such that the bead 26 of the second tube 24 is inserted past the at least one twist lock retaining arm 104. Once this occurs, the bead 26 of the second tube 24 applies an upward pressure on the ramped ends 94 of the redundant latch retaining arms 92 allowing the ramped ends 94 to disengage the second pair of redundant retainer lock windows 84 and advancement of redundant latch component 76 to the locked position. This is advantageous as it ensures proper installation because the redundant latch component 76 cannot be engaged unless the second tube 24 is properly received in the central bore 56 of the female segment 44.

The redundant locking quick connect assembly 20 may be unlocked in a similar two stage procedure. First, the handle H of redundant latch component 76 is pulled back from the locked position in the second direction along axis A to the unlocked position where the annular collar 88 of the redundant latch component 76 hits the flange 46 of the quick connect housing 28. This disengages the inwardly ramped ends 94 of the second pair of redundant latch retaining arms 92 from the first pair of redundant latch retainer arm windows 82 and retracts the first pair of redundant latch retaining arms 90 from interleaving engagement with the outside face 106 of the pair of twist lock retainer arms 104. Second, the handle H of redundant latch component 76 is twisted, also referred to as rotated, about axis A, thereby causing twist lock retainer 74 to be rotated about axis A to disengage the pair of twist lock retaining arms 104 from the pair of twist lock retainer arm windows 86. This releases the bead 26 of the second tube 24 and allows the second tube 24 to be withdrawn from the central bore 56 of the female segment 44.

Referring to FIG. 1, the redundant latch component 76 may additionally include a shoulder 110 extending axially in generally parallel relation with axis A from the annular collar 88 and protruding radially outwardly from at least one redundant latch retaining arm of the second pair of redundant latch retaining arms 92. The shoulder 110 contacts the guide channel pockets 102 of the twist lock retainer 74 and provides a space between the second pair of redundant latch retaining arms 92 and the guide channel pockets 102. This space gives the inwardly ramped ends 94 of the second pair of redundant latch retaining arms 92 room to deflect and disengage the first pair of redundant latch retainer arm windows 82 and the second pair of redundant latch retainer arm windows 84. Also, the female segment 44 of the quick connect housing 28 may further include at least one alignment tab 112 protruding radially outwardly from the exterior surface 52 of the female segment 44. At the same time, the twist lock retainer 74 may include an anti-rotation pocket 114 extending radially outwardly from the twist lock retainer 74 and axially from the proximal end 78 of the twist lock retainer 74. The anti-rotation pocket 114 receives the at least one alignment tab 112 restricting over rotation of the twist lock retainer 74 relative to the quick connect housing 28 by limiting rotational movement of the at least one alignment tab 112 as the twist lock retainer 74 is being rotated via twisting of handle H of inside face 108 to release the twist lock retaining arms 104. It should be appreciated that the alignment tab 112 and the anti-rotation pocket 114 do not prevent rotation of the twist lock retainer 74 altogether but instead limit the range or extent of such rotation relative to the quick connect housing 28.

The handle H of the redundant latch component 76 is shown as extending from the annular body 87, and in a non-limiting exemplary embodiment, being attached to the annular collar 88. In the non-limiting embodiment, the handle H is shown being generally U-shaped having a pair of legs 120 extending in generally parallel relation with the axis A upwardly from the annular collar 88 in the second direction to a cross-arm 122. The legs 120 and cross-arm 122 can be formed of any suitable material, and are preferable molded from a strong, rigid plastic material. The legs 120 extend from diametrically opposite sides of the annular collar 88, and are each shown having a pair of spring fingers 124 configured for snapping attachment within a corresponding opening 126 in the annular collar 88. Each opening 126 can be formed as a single opening sized for snapping receipt of the pair of spring fingers 124 therein, or separate openings can be formed for receipt of individual ones of the spring fingers 124 of each pair of spring fingers 124. The spring fingers 124 of each pair of spring fingers are compressed toward or away from one another, and then after being disposed through the respective opening(s) 126, spring resiliently to a less compressed state, whereat shoulders, also referred to as hooks 128 of the spring fingers 124 lock the handle H in fixed attachment to the annular collar 88. To facilitate retaining the hooks 128 in close engagement with a bottom surface of the collar 88, a truss, also referred to support leg or strut 130 extends in inclined relation from each leg 120 outwardly from the spring fingers 124 for close engagement with an upper surface of the collar 88. Regardless of the mechanism used to fix the handle H to the annular collar 88, the legs 120 are fixedly attached to the annular collar 88 against relative movement therewith. Accordingly, pushing, pulling, and twisting movement of the handle H causes concurrent pushing, pulling, and twisting movement of the redundant latch component 76.

With the handle H being fixedly attached to the collar 88 as a separate piece of material, female segment 44 of the quick connect housing 28 can be disposed into the redundant latch component 76, and then the legs 120 of the handle H can be attached to the collar 88, as discussed above, via being snappingly disposed into corresponding openings in the collar 88. As such, with the handle H being generally U-shaped, the male retention segments 30 and midsection 34 extend through a passage beneath the cross-arm 122, such that the cross-arm 122 extends about the midsections 34 and retains the quick connect housing 28 in coupled, assembled relation with the redundant latch component 76, thereby forming a subassembly for easy handing.

In accordance with another aspect of the disclosure, a method of constructing a locking quick connect assembly 20 for removably coupling at least one first tube 22 and a second tube 24 with one another is provided. The method includes: providing a quick connect housing 28 including a male retention segment 30 configured for coupled attachment with the at least one first tube 22 and a female segment 44 extending from the male retention segment 30 along an axis A and presenting a central bore 56 for receiving the second tube 24 in removably coupled attachment therein, with the female segment 44 being provided having a twist lock retainer arm window 86. Further, providing a supplemental latch component 76 configured for sliding movement along the female segment 44 between an unlocked position and a locked position, with the supplemental latch 76 component including an annular collar 88 and a latch retaining arm 92 extending from said annular collar 88 in generally parallel relation with the axis A. Further yet, providing a twist lock retainer 74 including a locking channel 96 extending generally parallel with the axis A and a twist lock retaining arm 104 extending circumferentially relative to the axis A. Then, disposing the supplemental latch component 76 about the female segment 44, and disposing the twist lock retainer 74 about the female segment 44, with the twist lock retaining arm 104 being configured to engage the twist lock retainer arm window 86 of the female segment 44 and to extend radially inwardly of the locking channel 96, and with the latch retaining arm 92 of the supplemental latch component 76 being partially disposed in the locking channel 96; and providing a handle H extending from the annular collar 88 in a direction opposite the latch retaining arm 92, with the handle H being configured to be pushed along the axis A to move the supplemental latch component 76 from the unlocked position to the locked position, whereat the latch retaining arm 92 is brought into overlying relation with the twist lock retaining arm 104 to maintain the twist lock retaining arm 104 in engaged relation with the twist lock retainer arm window 86, and with the handle H being configured to be pulled along the axis A to move the supplemental latch component 76 from the locked position to the unlocked position, whereat the latch retaining arm 92 is removed from overlying relation with the twist lock retaining arm 104.

In accordance with another aspect, the method can further include configuring the handle H to be rotated about the axis A when the supplemental latch component 76 is in the unlocked position to concurrently rotate the twist lock retainer 74 about the axis A, whereupon the twist lock retaining arm 104 is disengaged from the twist lock retainer arm window 86 of the female segment 44.

In accordance with another aspect, the method can further include providing the handle H being formed of a separate piece of material from the collar 88, with the handle H being subsequently fixed to the collar 88.

In accordance with another aspect, the method can further include snap fitting said handle H to said collar 88.

In accordance with another aspect, the method can further include providing the collar 88 having a plurality of openings 126 and providing the handle H having a pair of legs 120 with spring fingers 124, and snap fitting the spring fingers 124 into the plurality of openings 126.

In accordance with another aspect, the method can further include providing the male retention segment 30 of the quick connect housing 28 having a pair of male retention segments 30 extending away from a midsection 34 in coaxially aligned relation with one another for attachment of a pair of first tubes 22, with the female segment 44 extending from the midsection 34.

In accordance with another aspect, the method can further include providing said handle H being generally U-shaped extending about the midsection 34, having a pair of legs 120 extending from the annular collar 88 and a cross-arm 122 extending between the pair of legs 120.

In accordance with another aspect, the method can further include snap fitting the pair of legs 120 to the collar 88.

In accordance with another aspect, the method can further include configuring the second tube 24 to be received in the central bore and brought into locked engagement with the twist lock retaining arm 56 while pushing the handle H prior to the supplemental latch component 76 being moved from the unlocked position to the locked position.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A locking quick connect assembly for removably coupling at least one first tube and a second tube for fluid communication with one another, comprising:
 a quick connect housing including a male retention segment configured for coupled attachment with the at least one first tube and a female segment extending from said male retention segment along an axis and presenting a central bore for receiving the second tube in coupled attachment therein, said female segment including a twist lock retainer arm window;

a supplemental latch component configured for sliding movement along said female segment between an unlocked position and a locked position, said supplemental latch component including an annular body and a latch retaining arm extending from said annular body in generally parallel relation with said axis;

a twist lock retainer surrounding at least a portion of said female segment and at least a portion of said supplemental latch component, said twist lock retainer including a locking channel for receiving said latch retaining arm and including a twist lock retaining arm extending circumferentially in radially inward relation with said locking channel to engage said twist lock retainer arm window of said female segment and to underlie said latch retaining arm when said latch retaining arm is fully received in said locking channel and said supplemental latch component is in said locked position, whereat said latch retaining arm prevents release of said twist lock retaining arm from said twist lock retaining window; and a handle extending away from said annular body in a direction opposite the latch retaining arm.

2. The locking quick connect assembly of claim of claim 1, wherein said handle is formed of a separate piece of material from said annular body and subsequently fixed thereto.

3. The locking quick connect assembly of claim 2, wherein said handle is generally U-shaped.

4. The locking quick connect assembly of claim 1, wherein said male retention segment of said quick connect housing includes a pair of male retention segments extending away from a midsection in coaxially aligned relation with one another for attachment of a pair of first tubes, said female segment extending from said midsection.

5. The locking quick connect assembly of claim 4, wherein said handle is generally U-shaped extending about said midsection, having a pair of legs extending from said annular body and a cross-arm extending between said pair of legs.

6. The locking quick connect assembly of claim of claim 5, wherein said handle is formed of a separate piece of material from said annular body and subsequently fixed thereto.

7. The locking quick connect assembly of claim of claim 6, wherein said annular body has as an annular collar including a plurality of openings, said pair of legs being snap fit into said plurality of openings.

8. The locking quick connect assembly of claim of claim 7, wherein each leg of said pair of legs includes a spring finger, said spring fingers being snap fit into said plurality of openings.

9. The locking quick connect assembly of claim of claim 1, wherein said handle is configured to be pushed along said axis to move said supplemental latch component from the unlocked position to the locked position, and wherein said handle is configured to be pulled along said axis to move said supplemental latch component from the locked position to the unlocked position.

10. The locking quick connect assembly of claim of claim 9, wherein said handle is configured to be rotated about said axis when said supplemental latch component is in the unlocked position to rotate said twist lock retainer about said axis, whereupon said twist lock retaining arm is disengaged from said twist lock retainer arm window of said female segment.

11. A method of constructing a locking quick connect assembly for removably coupling at least one first tube and a second tube with one another, comprising:

providing a quick connect housing including a male retention segment configured for coupled attachment with the at least one first tube and a female segment extending from said male retention segment along an axis and presenting a central bore for receiving the second tube in removably coupled attachment therein, said female segment being provided having a twist lock retainer arm window;

providing a supplemental latch component configured for sliding movement along said female segment between an unlocked position and a locked position, said supplemental latch component including an annular body and a latch retaining arm extending from said annular body in generally parallel relation with said axis;

providing a twist lock retainer including a locking channel extending generally parallel with said axis and a twist lock retaining arm extending circumferentially relative to said axis;

disposing said supplemental latch component about said female segment;

disposing said twist lock retainer about said female segment, with said twist lock retaining arm being configured to engage said twist lock retainer arm window of said female segment and to extend radially inwardly of said locking channel, and with said latch retaining arm of said supplemental latch component being partially disposed in said locking channel; and providing a handle extending from said annular body in a direction opposite the latch retaining arm, with said handle being configured to be pushed along said axis to move said supplemental latch component from the unlocked position to the locked position, whereat said latch retaining arm is brought into overlying relation with said twist lock retaining arm to maintain said twist lock retaining arm in engaged relation with said twist lock retainer arm window, and with said handle being configured to be pulled along said axis to move said supplemental latch component from the locked position to the unlocked position, whereat said latch retaining arm is removed from overlying relation with said twist lock retaining arm.

12. The method of claim 11, further including configuring the handle to be rotated about said axis when said supplemental latch component is in the unlocked position to concurrently rotate said twist lock retainer about said axis, whereupon said twist lock retaining arm is disengaged from said twist lock retainer arm window of said female segment.

13. The method of claim 12, further including providing the handle being formed of a separate piece of material from said annular body, with the handle being fixed to the annular body.

14. The method of claim 13, further including providing the annular body having an annular collar, and snap fitting said handle to said annular collar.

15. The method of claim 14, further including providing the annular collar having a plurality of openings and providing the handle having a pair of legs with spring fingers, and snap fitting the spring fingers into the plurality of openings.

16. The method of claim 11, further including providing the male retention segment of said quick connect housing having a pair of male retention segments extending away from a midsection in coaxially aligned relation with one another for attachment of a pair of first tubes, with said female segment extending from said midsection.

17. The method of claim 16, further including providing said handle being generally U-shaped extending about said midsection, having a pair of legs extending from said annular collar and a cross-arm extending between said pair of legs.

18. The method of claim 17, further including snap fitting the pair of legs to said annular body.

19. The method of claim 11, further including configuring said second tube to be received in said central bore and brought into locked engagement with the twist lock retaining arm while pushing the handle prior to said supplemental latch component being moved from the unlocked position to the locked position.

20. The method of claim 19, further including causing said supplemental latch component to be moved from the unlocked position to the locked while pushing the handle.

* * * * *